United States Patent Office 3,181,140
Patented Apr. 27, 1965

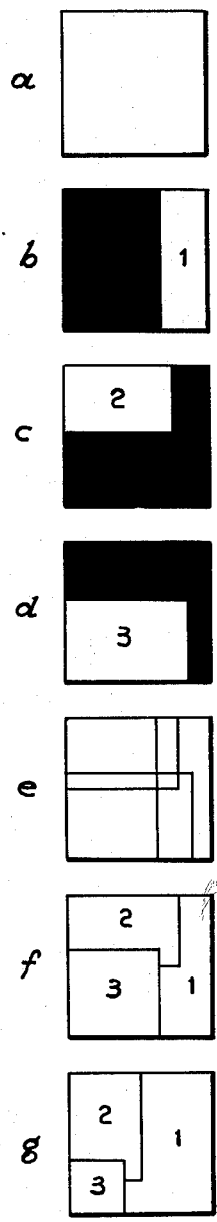
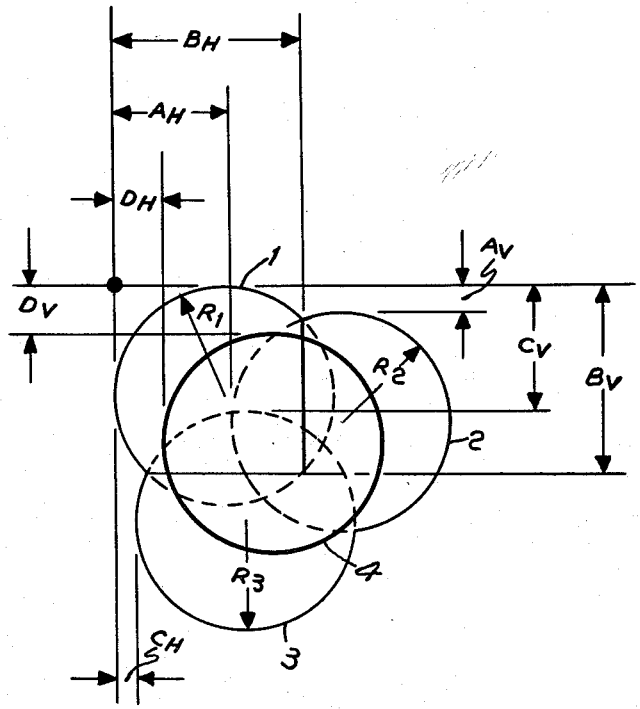
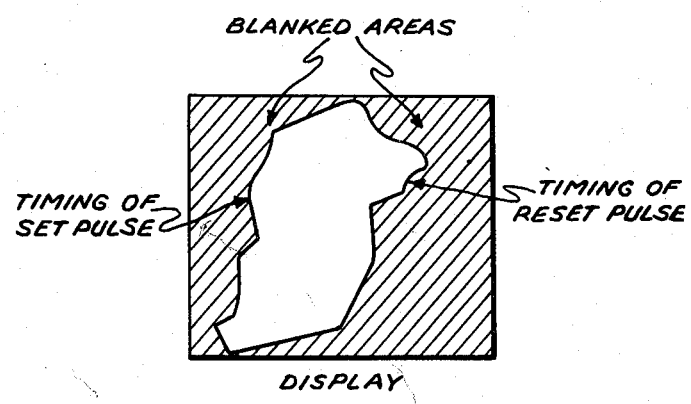

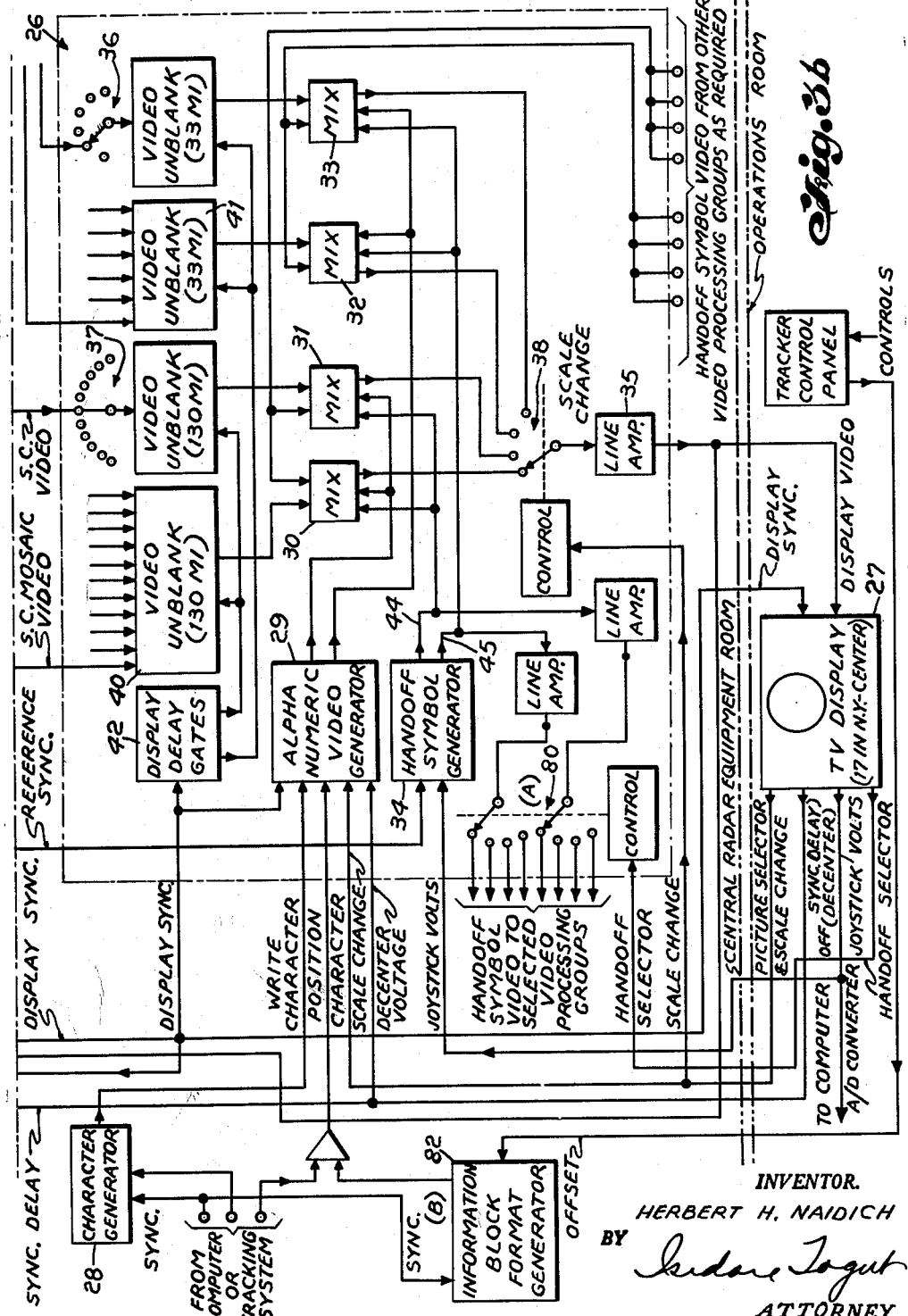

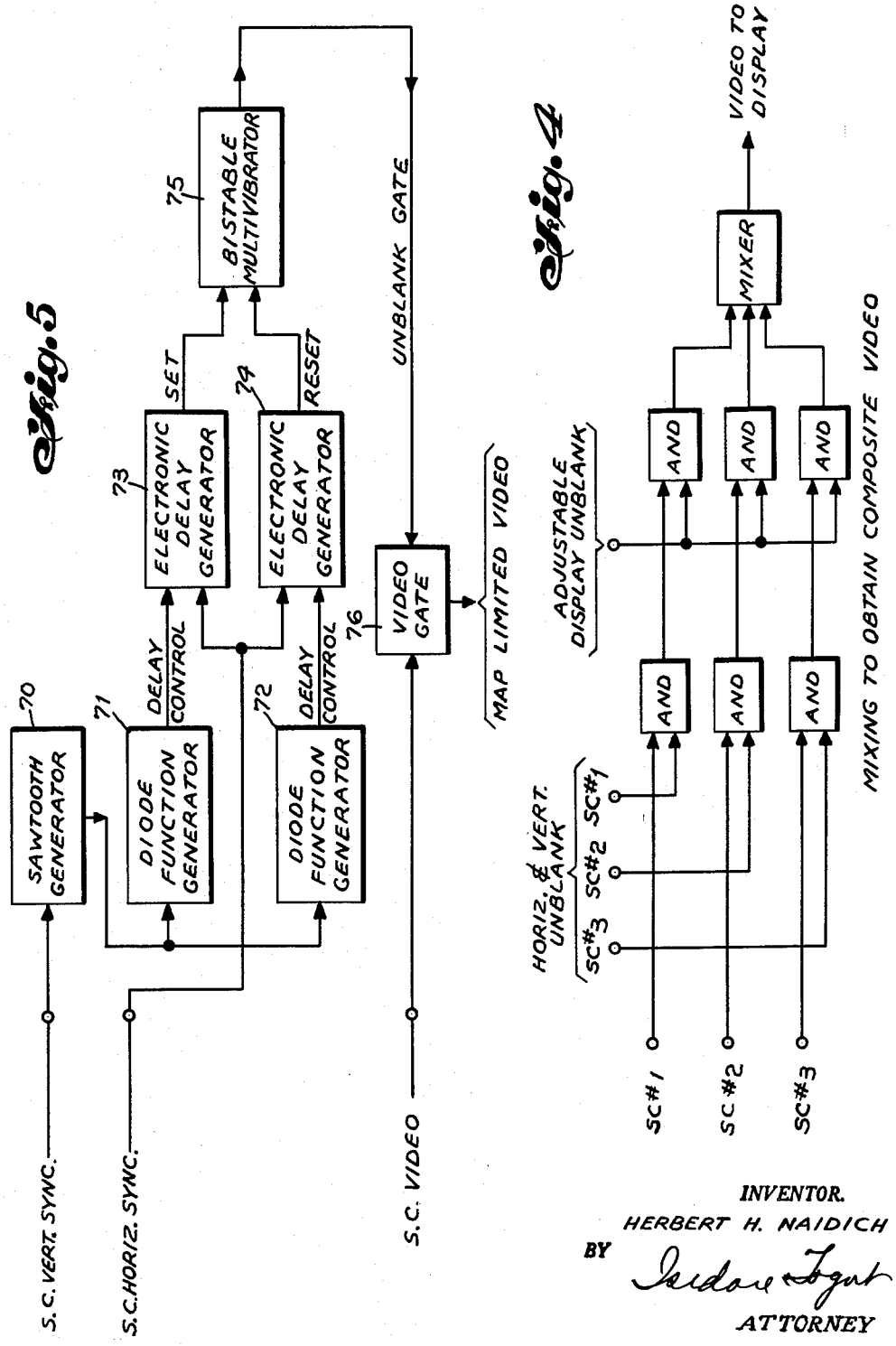

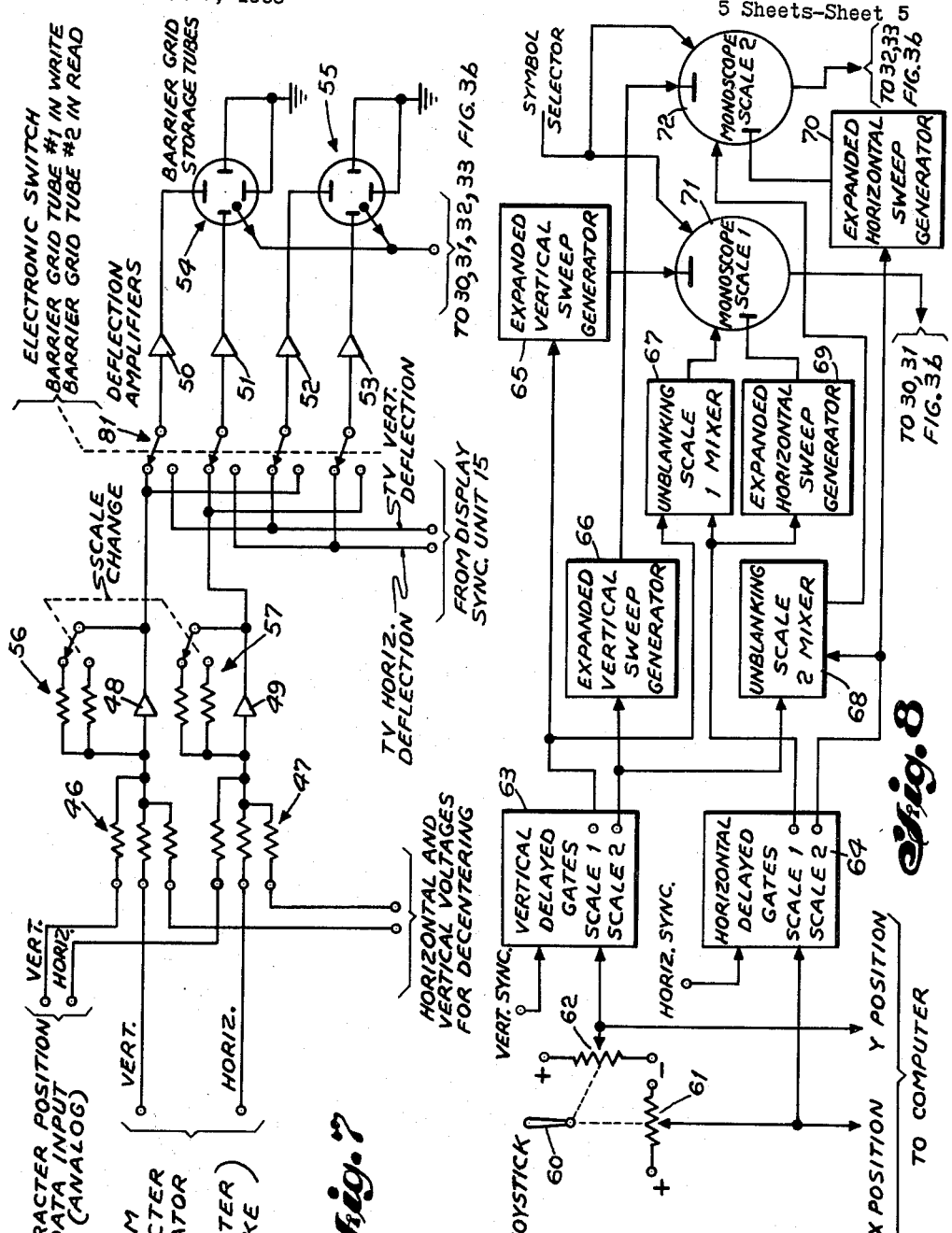

3,181,140
MULTIPLE SCAN CONVERTER DISPLAY SYSTEM
Herbert H. Naidich, Passaic, N.J., assignor to International Telephone and Telegraph Corporation, Nutley, N.J., a corporation of Maryland
Filed Mar. 6, 1963, Ser. No. 263,326
7 Claims. (Cl. 343—5)

This invention relates to a mosaic display radar system for use in air traffic control and more particularly to a multiple scan converter display system.

The continued growth of air traffic, the expansion of business and industrial use of all types of aircraft and the increasing importance in use of high speed military and civil jet powered aircraft necessitate an improvement in air traffic control and navigation. For effective air traffic control, the radar controller requires a display which combines radar and non-radar data, such as alpha-numeric flight plan data. It is also necessary that handoff capability between two controllers at separate displays be simple and effective and that the display be capable of using data from the same radar or from separate radars. It is desirable that at air traffic control centers where the radar or radars have extended coverage, it should be possible for one controller to hand over to another controller an aircraft as it flies in toward the airport or away therefrom and that the displays should be able to track the particular aircraft from geographical sector to geographical sector as it proceeds on the course. It has long been recognized that it would be highly desirable to combine the coverage from several asynchronous radars which cover a particular geographic area. It has been proposed to develop such systems using multiple gun cathode tubes, optical combining of several projected displays, plotting boards or processed video displays, or time shared sweeps. These systems have severe limitations, several of which are: lack of registration, lack of flexibility, insufficient brightness, and loss of information.

It is another object to provide a mosaic display radar handoff system for air traffic control which provides a unique and simple way of affecting a mosaic-type radar display of contiguous geographical areas.

A feature of this invention is a multiple scan converter system for presenting a mosiac display of discrete geographical areas that comprise a plurality of scan converters and at least one radar system, the output of which is coupled in discrete quantities to the scan converters. That is, the radar will scan a complete area but different portions of this area can be coupled to different scan converters. It is also possible to have more than one radar which is similarly coupled to other scan converters. There are provided means to limit the video output of each said scan converters within the geographical sector output of the scan converter and a cathode ray display tube. The outputs of the scan converter are coupled to the display tube and the synchronizing signals of the scan converters are synchronized to the synchronizing signals of the display tube and there is provided means to vary the timing of the synchronizing signals of both the scan converters and the display tube to provide a sync phasing whereby there is produced on the screen of the display tube a mosaic display of the outputs of the scan converters.

The above-mentioned and other features and objects of this invention will become more apparent by reference to the following description taken in conjunction with the accompanying drawings, in which:

FIGS. 1a–g are diagrams which show how television displays from different sources are combined using the principles of this invention;

FIG. 2 is an example of a television display coverage according to this invention;

FIGS. 3a and 3b are block diagrams which taken together show the complete system of this invention;

FIG. 4 is a block diagram of a video gating circuit;

FIG. 5 is a block diagram of the circuitry of the map limiting blanking generator;

FIG. 6 is a typical display resulting from the operation of the map limiting circuitry of FIG. 4;

FIG. 7 is a block diagram of the circuitry used for generating the alpha-numeric presentation on the scan converter television display; and FIG. 8 is a block diagram of the handoff symbol generator.

Figure 3A:
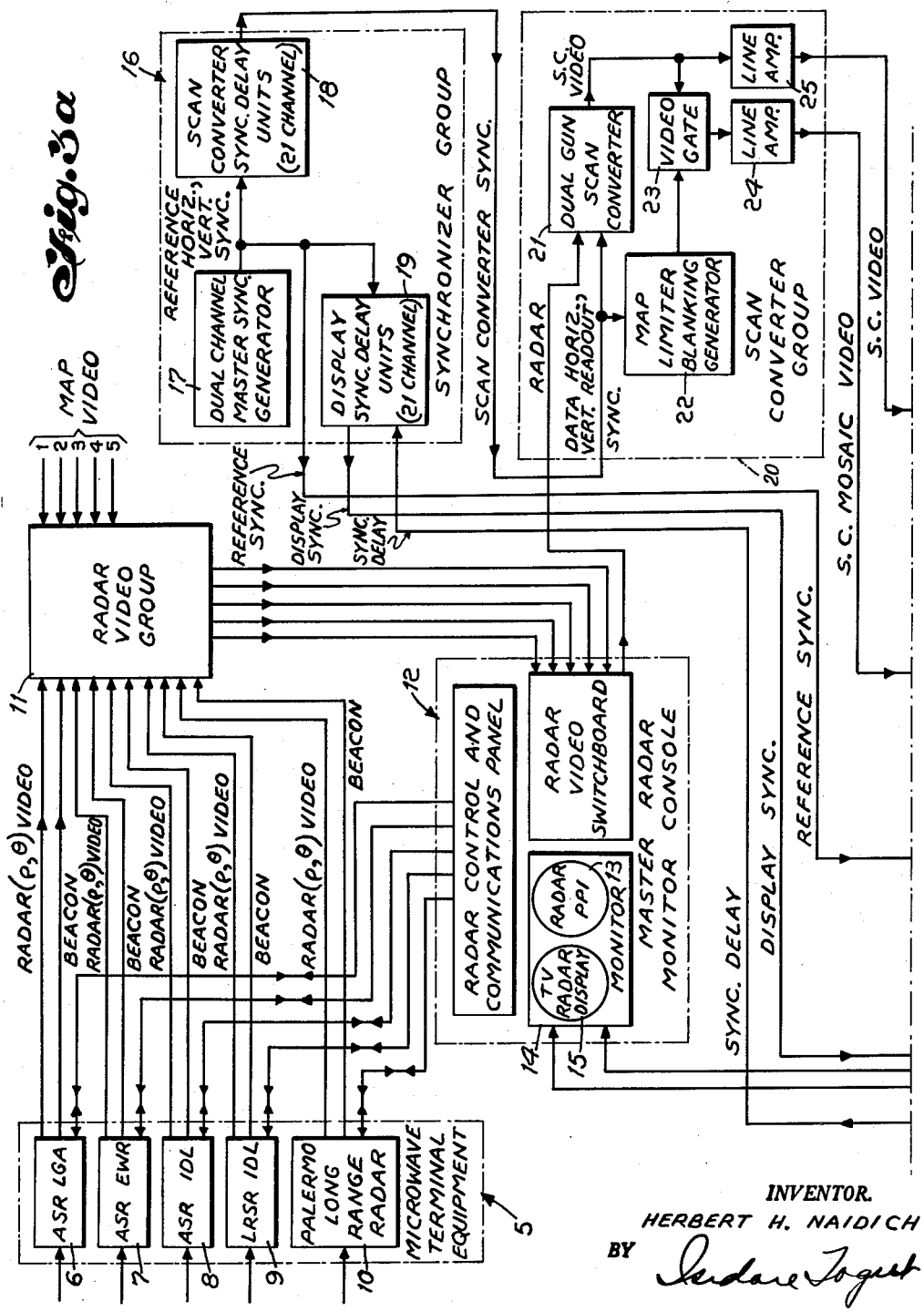

This invention provides a unique method of combining the outputs from several scan converter tubes that allow the establishment of a basic system with alpha-numeric and radar handoff capabilities. Such a system provides a brilliant display and a flicker-free presentation with the simultaneous presentation of raw radar (non-processed) data and stored information (video maps, alpha-numeric and other data). The system has simple radar handoff capabilities which allow handoff between two controllers at separate displays and the displays could use data either from the same radar or from separate radars. This mosaic display radar handoff system is based on the concept of a central video conversion center which combines the unsynchronized raw radar video from multiple sources and converts it to a common TV coordinate system. Each traffic controller has the ability to choose a particular area of coverage he wishes presented on his display independently of all the other controllers. The system of this invention utilizes a standard scan converter which includes a two-gun storage tube device that is used to convert the conventional PPI display with its polar coordinates to a bright, flicker-free TV display. The radar information is fed into one gun of the tube where the picture is written on a storage surface in polar coordinates. The storage time of this surface is adjustable. Simultaneously, the picture is electronically read (from the storage surface) out of the second gun at TV frame rates. The video thus obtained can be presented on a bright TV display which is deflected in synchronism with the scan converter readout. To facilitate the identification of radar targets during the handoff of an aircraft between controllers, the outputs from several radars are combined, using scan converters, to generate a composite radar picture. This invention utilizes the technique of adjusting the relative delay between the start of the scan converter readout sweep and the start of the display sweep. In television-type displays, vertical displacement of a picture occurs when the receiver and transmitter vertical syncs are not in phase. Horizontal displacement of the picture occurs when the horizontal syncs of the transmitter and receiver are not in phase. The technique of delaying the start of one sweep with respect to another is referred to herein as sync phasing and permits the generation of a composite display of the terminal area of the airport center from several raw or MTI radar inputs and it also allows the off-centering circuit capability provided to each controller which permits him to view any portion of the composite display on his bright cathode ray tube by varying the sync phasing controls which are preferably located on his console.

With reference to FIG. 1, there is illustrated the principles involved in combining the outputs from several scan converters to generate a composite display by the adjustment of the relative phasing or time differential between the scan converter readout sync pulses and the sync pulses to the individual display. As illustrated and explained in the diagram of FIG. 1, the radar picture moves to the right when the display horizontal sync leads in time the scan converter sync and the video is blanked as indicated. Similarly, the radar picture moves down when the display vertical sync is made to lead in time the scan converter vertical sync.

In FIGURE 1a, the scan converter readout and display horizontal and vertical syncs are in phase. In FIG. 1b, the scan converter readout horizontal sync lags the display horizontal sync by ⅝ horizontal time and the scan converter readout video is unblanked for the first ⅜ horizontal time. In FIG. 1c, the scan converter readout horizontal sync leads the display horizontal sync by ¼ horizontal time. The video is unblanked for the last ¾ horizontal time. The scan converter readout vertical sync leads the display vertical sync by ½ vertical time with the video unblanked for the last ½ vertical time of the scan converter readout. As shown in FIG. 1d, the scan converter readout horizontal sync leads the display horizontal sync by ⅛ vertical time. The video is unblanked for the last ⅞ horizontal time of the scan converter readout. The scan converter readout vertical sync lags the display vertical sync by ⅜ vertical time and the video is unblanked for the first ⅝ vertical time of the scan converter readout. There is shown in FIG. 1e, three scan converter readouts phased as indicated in FIGS. 1b, 1c and 1d and mixed on a common TV display to give the indicated overlapping presentation. In FIG. 1f, the overlaps shown in FIG. 1e have been eliminated by logical circuitry on unblanking gates. In FIG. 1g, the display has been decentered by changing the display horizontal and vertical sync phasing. The horizontal sync has been retarded by ¼ vertical time and the vertical sync has been advanced ¼ of vertical time from the phasing shown in FIG. 1f.

In all of the diagrams shown in FIG. 1, a square display and scan converter storage surface are assumed as well as an all white picture.

If the relative delays (or phase shifts) are held fixed between the three scan converters indicated, and if these delays are selected to correspond to the geographical relationship of the area covered by the three radars, it is possible for many displays to use the scan converter video, each capable of being independently positioned, using off-centering phasing controls on the display to select the desired portion of the composite display for viewing. These multiple scan converters can operate from a single radar, or alternately, each scan converter can represent a different radar. This system is not limited to three scan converters through three have been used for purposes of illustration in describing the operation of this invention. A large number of scan converters may be used, each representing an adjacent or overlapping geographical area; however, video signals from the scan converters representing areas outside that being viewed on each display must be blanked. A scan converter whose coverage is displaced from one whose geometric position is proportional to 360 degrees of horizontal and vertical phase delay (i.e. delay equal to one TV scan line or frame time) has coincident syncs. When proper video blanking is introduced, it is possible for the operator of the display to adjust his coverage continuously by varying the horizontal and vertical sync delays through an entire chain of scan converters which cover adjacent areas.

In FIG. 2, there is shown a timing diagram for a three scan converter system with an arbitrarily selected geographical coverage. The horizontal and vertical video unblanking areas would be selected by the display operator. The circles 1, 2 and 3 represent the arbitrarily selected geographical areas with overlapping areas. The circle 4 with the darker outline is the typical TV display coverage. The scan converter timing is shown in the following table with reference to the diagram of FIG. 2.

*Scan converter timing*

|  | $SC_1$ | $SC_2$ | $SC_3$ |
|---|---|---|---|
| Horizontal sync | Reference (0) | Lags by $A_H$ | Lags by $C_H$. |
| Vertical sync | Reference (0) | Lags by $A_V$ | Lags by $C_V$. |
| Horizontal video unblank. | Reference (0) to $B_H$. | $B_H$ to end of sweep. | Start to end of sweep. |
| Vertical video unblank. | Reference (0) to $B_V$. | $A_V$ to end of sweep. | $B_V$ to end of sweep. |

When both scan converter 2 and scan converter 3 are unblanked logic circuitry would designate priority. In the case indicated in FIG. 2, unblanking gates are arranged to allow $SC_3$ unblanking to have priority, when there would be an overlap of $SC_2$ and $SC_3$ video, below $B_V$, and $SC_2$ above $B_V$. $D_V$ and $D_H$ represent the typical individual display coverage adjustments, operator controlled.

Referring now to FIGURES 3a and 3b, considered as one figure, there is shown a block diagram of a proposed central radar display system which for purposes of illustration embraces the New York area. There is shown a microwave terminal equipment 5 which comprises a group of terminals for reception of radar data 6, 7 and 8 being terminals for airport surveillance radars for La Guardia, Newark and Idlewild airports, respectively, and terminals for radars 9 and 10 which are terminals for long range airport surveillance radars. The terminal equipment used in terminal equipment 5 consists of standard equipment now presently being used by the Federal Aviation Agency to link a central operating station to the remote radar sites. All radar and beacon signals are first sent to the radar video group 11 for processing. All control and communication signals to the radar sites are routed from the master radar monitor console 12. The radar video group 11 processes the video from the several radars and transmits the polar coordinate video to the writing gun of the scan converter tube to be described later on. The video processing involves techniques which are well known. MTI, normal and beacon video can be mixed with range marks on a selectable basis. Video mapping might be added if not already mixed at the radar site. A beacon filter could be included to select beacon returns from particular targets. The processed polar coordinate radar data is then sent to the master radar monitor console 12. The function of the master radar monitor console is to communicate with radar sites and the individual display controllers. It also displays the operating status of the radar systems under its control, including individual units of any particular radar. The master radar monitor console controls the various detailed operations of the individual radars with the capability of assigning some control functions to particular controllers. It transmits the radar video to the appropriate scan converter and makes the necessary changes in the event of radar or scan converter failure, by means of the radar video switchboard. It can display any of the five radars on the PPI 13 in the monitor section 14 of the master radar monitor console. Also displayed is a TV monitor picture on the TV radar display 15 which is capable of being switched to the picture being used by any of the individual display positions. At the master radar monitor console, it is possible to determine the operating condition of the entire radar and display complex. By switching the video signals, the PPI picture 13 from each of the radars can be displayed before it is scan converted. An adjacent TV display 15 is capable of monitoring the scan converter TV picture being sent to each of the individual controller displays (with inclusion of alpha-numeric and target handoff symbols).

The synchronizing signals for the radar and scan converters are generated in the synchronizer group 16. The synchronizer group 16 consists of a master sync generator 17 which generates the basic clock pulse for the TV system and is of conventional circuitry. An example of a sync generator which can be used in this application is disclosed in United States Patent No. 2,794,069. It is to be understood, however, that any other suitable sync generator, such as used in television systems, may be used. The master sync generator 17 generates the horizontal and vertical synchronizing pulses to which the scan converters and displays are locked. To insure greater reliability, dual channels are provided. The output of the master sync generator 17, which is the reference horizontal and vertical sync signal, is coupled to a scan converter sync delay unit 18 and a display sync delay unit 19. Both these units are conventional in circuitry and provide the necessary controllable sync delays for this invention. An example of a suitable delay circuit is shown in United States Patent No. 2,811,696; however, any delay circuit can be used which will provide the variable delay. The scan converter sync delay unit 18 supplies properly phased sync pulses to the respective scan converter coupled thereto and has long term stability and fine adjustment capability. The display sync delay unit 19 provides horizontal and vertical delay to the respective TV display and is easily controllable from the remote display position. Off-centering controls on each display adjust the delay of the unit assigned to the particular display. Horizontal delay changes move the picture along east-west directions and vertical delay changes shift the picture in north-south directions as previously explained. Each of these scan converter units and the TV display have, of course, the necessary deflection circuits responsive to the sync pulses.

The radar output from the master radar monitor console 12 is fed into a scan converter group 20 which comprises a dual gun scan converter 21, a map limiter blanking generator 22, a video gate 23 and line amplifiers 24 and 25. Seventeen such scan converter groups would be required for the New York area. The scan converter group 20 accepts the polar coordinate radar data and converts it to TV. The geographical coverage of the individual scan converters has been previously described. The scan converter 21 has associated with it the map limiter blanking generator 22 which will be described later on. The map limiter blanking generator 22 blanks the areas of geographical coverage which are assigned to other scan converters. There are two outputs of the scan converter group 20. One output from the line amplifier 25 gives the full coverage of the scan converter and the other output from the video gate 23 gives the map limited coverage and is used in the video mosaic.

The map limiter blanking generator is shown in FIG. 5. There are several techniques suitable for generating the required blanking gates. One technique would be similar to that used in generating video maps, often referred to as a flying spot scanner.

The technique indicated in FIG. 5 is less costly and more applicable to the particular problem.

The scan converter vertical sync starts the sawtooth generator 70. This sawtooth is similar to the vertical deflection waveform which deflects the scan converter readout. This sawtooth is sent to two diode function generators 71 and 72. The diode function generator is a standard device often used in analogue computers. It converts the linearly varying sawtooth function to a more complex one, composed of linear segments which are adjustable, by means of potentiometers for each segment. In this case, the sawtooth would be converted to a function which can vary its shape by a factor of 10 in both magnitude and sign, at selectable points of the input sawtooth. The diode function generators generate voltages which control the delays of the two electronic delay generators 73 and 74. These delay generators are synchronized to the scan converter horizontal sync, and pulses are generated whose delay is proportional to the function which has been set into the diode function generator. Delay generator 73 is used to set a bistable multivibrator 75 and delay generator 74 is used to reset it. The gate thus generated is used to unblank the scan converted video in the video gate 76. FIG. 6 illustrates a TV display with a map-limited all white display. It is a simple matter to adjust the set and reset points of the bistable multivibrator 75 by observing the display while adjusting the potentiometers which control the shape of the outputs of the diode function generators 71, 72. The output of the scan converter group 20 together with the reference sync signals from the synchronizer group 16 are coupled to a video processing group 26. In the central radar display system illustrated here, we assume seventeen scan converter groups 20. Each of the scan converter groups is assigned to a particular geographical area. Each of the video processing groups is assigned to an individual display and seventeen video processing groups would be required for the New York area. The functions of the video processing group 26 is to accept video from the scan converter 20 and present the desired video to a TV type display 27 after appropriate and desired switching. It also accepts alpha-numeric data from a character generator 28, converts it to TV video in the alpha-numeric video generator 29 and mixes it with the radar video in the mixers 30, 31, 32 and 33. The video processing group also generates an identifying handoff signal in the handoff symbol generator 34 which is positioned over a target by a joy stick at the display. The joy stick voltage controls the position of a circle or symbol which identifies a particular aircraft that is to be handed over from one controller to another and thereby this symbol is routed to any of several selected displays where it appears over the same target. The handoff symbol generator is explained later, with reference to FIG. 8. The video processing group also accepts handoff symbol video from other video processing groups that have routed their symbol video to this particular video processing group, and mixes it with the scan converted video to identify the selected target. Finally, the video processing group transmits the processed video to the associated TV display 27 and to the master radar monitor console 12. The scan converter group 20 transmit both full and map-limited video as explained above to the video processing group. In this system, for example, there are six scan converters 20 assigned to a 33 mile per diameter video mosiac, and eleven assigned to a 130 mile per diameter video mosaic. A display operator has the option of looking at the outputs of any of the seventeen scan converter groups 20. The 130 mile per diameter map limited video is sent to video unblanking unit 40 and the 33 mile per diameter video to video unblanking unit 41, where the gates from the display delay gate generator 42 selects the sector of the mosaic selected by the display operator. The non-map limited video is transmitted from line amplifier 25 to either the switch 37, for 130 mile diameter video or switch 36 for 33 mile per diameter video. These switches allow the display operator to select any of the scan converters in the system to be displayed without map limiting. These switches would be remotely controlled from the display position. Switch 38 allows the operator to select either the 130 or 33 per mile video, with or without limiting from mixers 30, 31, 32, 33 for transmission to the display by means of line amplifier 35. Mixer 30 supplies the 130 mile per diameter sync phased video mosaic and mixer 32 the 33 mile per diameter sync phased video. As described previously, the display operator can now decenter his display to any area covered by the video mosaics.

The alpha-numeric video generator 29 accepts character stroke data from the character generator 28. The stroke data causes the writing beam to trace out the desired character on the barrier grid storage surface, and will be later described with reference to FIG. 7. Simultaneously, the analog $x$ and $y$ positioning voltages from either a computer or a target tracking system specifies the position of the selected character. The analog voltages which control the off-centering of the display are subtracted from these voltages to determine the specific location on the display. The readout of the two barrier grid storage tube alpha-numeric generator is conducted in synchronism with the display raster. The handoff symbol generator 34 generates an identifying symbol which is characteristic of the particular video processing group 22 and control position of the controller who is initiating handoff. The symbol is positioned as stated above to the desired target by the controller by means of a joy stick located at the controller's display. The symbol is video and is mixed with the scan converted video in the mixers 30, 31, 32 and 33 and then appears on the display of the controller initiating the handoff. He selects the video processing group assigned to the display of the controller who is to accept the handoff and switches the symbol video to this particular video processing group by means of switch 80. This video is sent over two lines 44 and 45, at the two video scales allowing the symbol to appear on his own display on either the 130 mile per diameter or the 33 mile per diameter scale, as selected by switch 38.

With reference to FIGURE 7, the generation of the alpha-numeric data will now be described. The desired character data is fed into the alpha-numeric video generator 29 from the character generator 28. The alpha-numeric video generator shown in FIGURE 7 comprises addition circuits 46 and 47 which couple the desired character data from the character generator 28, and the horizontal and vertical voltages for decentering, and additionally, the character position data input voltages. The outputs of the addition circuits 46 and 47 are coupled respectively to operational amplifiers 48 and 49 and the outputs of the operational amplifiers are coupled via deflection amplifiers 50, 51, 52 and 53 to barrier grid storage tubes 54 and 55. The outputs of the barrier grid storage tubes 50 and 51 are then coupled to the mixers 30, 31, 32 and 33. The barrier grid storage tube may be of the type known as FW-202 manufactured by International Telephone and Telegraph Corporation and is an electrostatically focussed and deflected storage tube with high resolution capabilities. The barrier grid storage tube has a single electron gun which is used for both writing and reading in alternate modes and the tube can be adjusted so that after three reads at television rates, the information on its storage surface is completely erased. The alpha-numeric information is written into one of the barrier grid tubes while the second tube is being read in synchronism with the scan converter readout, thus combining the radar video with the alpha-numeric video in the mixers 30, 31, 32 and 33. After three vertical readouts, which are equivalent to six TV fields, the barrier grid storage tube which is in mode is switched to "read" and the "read" tube is switched to "write" by means of the electronic switch 81. The alpha-numeric data is updated every one-tenth of a second by this means and as the readout is on a continuous basis, no flicker results. The barrier grid buffer storage system has extremely high accuracies for the identical deflection drivers are used for "read" and "write" sweeps. Non-linearities due to driver tube limitations and geometric distortions in the barrier grid deflection system are thereby cancelled. The flicker-free alpha-numerics and symbols can be updated every one-tenth of a second if necessary or erased with no smear. The persistence of the scan converter storage surface which contains radar data can be independently adjusted for a controllable target trail, independently of the alpha-numerics, since they are being read from an independent storage surface. The character generator 28 is a standard unit, such as the "Curviline" model, manufactured by R.M.S. Associated, Inc., Mamaroneck, N.Y., which accepts digital character data from a radar tracking system or computer, and converts it into the proper $x$ and $y$ deflection voltages that cause the electron beam in the barrier grid storage tubes to trace out the desired character. Simultaneously, analog position voltages are added to these character strokes to determine the position of the character with reference to the radar origin. The alpha-numeric character data is generally written in the form of a data block which appears as identifying information next to a radar blip on the display. The information block format generator 82 is programmed to generate incremental position voltages in order that the alpha-numeric data block appears in a desired format. The offset input to the information block format generator is used to set the relative position of the data block with respect to the radar "blip" in order to avoid interference which might occur when many "blips" with associated data blocks were presented on the display. Techniques for accomplishing the information block format generator are well known. One such system is used on the Tasker Tracking System. The vertical and horizontal decentering voltages are subtracted from these position voltages to determine the position of the character on the display. These are the same voltages which are also sent to the vertical and horizontal sync delay units from the TV display center to effect the decentering of the display by the sync phasing technique. The addition-subtraction process is accomplished in the operational amplifiers 48 and 49 as indicated and the gain of these amplifiers can be switched to effect scale changes by virtue of the scale change switch and circuits 56 and 57.

One of the difficulties encountered in radar handoff systems is due to the fact that a PPI is essentially a slant range representation. When video signals from radars at different locations are combined, some double targeting may occur in the zone of overlap due to the slant range problem. The displacement of two "blips," each of which represents the signal return from individual non-collocated radars, is a function of the aircraft's altitude and range from the individual radars.

With reference to FIGURE 8, there is shown a block diagram of the joy stick handoff generator which supplies handoff symbol video to two banks of scan converters operating at different scale factors. The joy stick 60 is geared to horizontal and vertical potentiometers 61 and 62 which supply analog position voltages of the handoff symbol. Upon command these voltages are sent to a computer (not shown), where, after analog-to-digital conversion, they are entered into the computer as position reports. The joy stick marker position voltages are also sent to the vertical and horizontal delay gate generators 63 and 64 of the handoff symbol generator 34. Two horizontal and two vertical gates are generated whose delays are proportional to the marker position voltages and the two video scale factors. These gates are mixed and used to unblank and deflect two monoscopes 71, 72 at the appropriate times. The outputs of vertical delayed gate 63 are coupled to expanded vertical sweep generators 65 and 66 and to unblanking scale 1 and scale 2 mixers 67 and 68. The outputs of horizontal delayed gate 64 are coupled to expanded horizontal sweep generators 69 and 70 and to unblanking scale 1 and 2 mixers. The outputs of sweep generators 65 and 69 and scale 1 mixer are coupled to monoscope 71. The outputs of sweep generators 66 and 70 and scale 2 mixer are fed to monoscope 72. The scale 1 and scale 2 handoff symbol video available from the respective monoscopes are mixed with the scan converted video at the display adjacent to the joy stick. Simultaneously, by means of the handoff selector switch, the handoff symbol video is routed to the display of the controller who is designated to accept the handoff. The handoff symbol video is similarly mixed with the radar alpha-numeric video on the two video scales available to the display designated to accept the radar handoff. As the symbol delay circuitry is synchronized to the scan converter video read-out systems, each display can be individually decentered without changing the geographic relationship of handoff marker to target video. The joy stick control is used by the controllers for radar handoff between the controllers, tracking gate assignments, and target position reports to the computer.

In order to effect a completely manual handoff which does not involve either a tracking system or a computer, the controller desiring to handoff a target will position an identifying marker so that it encompasses the desired target by means of the joy stick control. He then pushes a handoff button which causes a flashing light to alert the designated controller of the approaching handoff. Simultaneously, the handoff symbol data is routed to the appropriate controller. The symbol appears on the designated target only on the display of the controller who will accept the handoff, even though other controllers are observing the areas covered by these displays. When he accepts the handoff, the receiving controller acknowledges the flashing light by pushing it, causing it to change color on his board and on the board of the controller initiating handoff. As each controller is assigned a unique handoff symbol the sector which is initiating handoff is immediately identified by the receiving controller. Note that the pushbutton lights are not essential to the system. It helps to alert the receiving controller.

The handoff of a target will be made on the portion of the composite picture containing radar video from the same radar as the one used by the accepting controller. In the event that the basic coverage of the sector from which the aircraft is arriving involves another radar, the controller in this sector will have overlapping coverage from both radars on his display. By observing the target trails, he will identify the desired aircraft target on the radar of the accepting controller before he initiates handoff.

The handoff symbol is generated by scanning the monoscope in synchronism with the TV sweep at the instant the display sweep is passing the point on the display where it is desired to position the symbol. The monoscope is a storage tube with symbols which are permanently stored on the readout storage surface. Any one of these stored symbols can be assigned to a particular controller. By delaying the start of the expanded sweep circuits, which deflect the monoscope readout beam, the handoff symbol can be positioned by horizontal and vertical delay circuitry connected to the joy stick control. These delay circuits are synchronized to the scan converter readout video.

In the general case, the scan converter video central will supply video mosaics at two or more different scales. For example, one bank of scan converters might be operating at a scale of 33 miles per diameter, and another bank might operate at a scale of 130 miles per diameter. The time scale ratio would be 33 miles per 30 microseconds (horizontal) and 33 miles per 15.7 milliseconds (vertical) for the first case and 130 miles per 30 microseconds (horizontal) and 130 miles per 15.7 milliseconds (vertical) in the second case. These time scales are based on the TV standards used in the FAA Scan Conversion Systems.

A controller moving the handoff circle horizontally while observing the 130-mile per diameter video, delays the monoscope horizontal expanded sweep readout at a rate of 4.33 miles for each microsecond of delay. In order to move the handoff circle or symbol 4.33 miles in a horizontal direction on the 33-mile per diameter scan converted video, it is necessary for the change in delay to be greater by a factor of $$\frac{130}{33} = 3.93$$

Similarly, the vertical delay must be 3.93 times as much in time for the 33-mile per diameter video as for the 130-mile per diameter video. Suitable fixed phase adjustments must be made to these delay generators to account for the geographic references of the two video scan converter complexes. A movement of the joy stick will displace the handoff symbol an identical number of miles in X and Y on the respective scan converted video if the scale factors (microseconds per mile) are suitably proportioned. It will probably be more convenient to choose scales which are multiples of each other (say 33 and 132 for the New York area).

While I have described above the principles of my invention in connection with specific apparatus, it is to be clearly understood that this description is made only by way of example and not as a limitation to the scope of my invention as set forth in the objects thereof and in the accompanying claims.

I claim:
1. A multiple scan converter display system comprising:
   a plurality of scan converters,
   a source of input signals for said scan converters,
   a cathode ray display tube,
   a source of synchronizing signals for said scan converters and said cathode ray display tube,
   means coupling the outputs of said scan converters to said display tube,
   means synchronizing the synchronizing signals of said scan converters to the synchronizing signals of said display tube,
   and means to vary the timing of said synchronizing signals of said scan converters and said display tube whereby there is produced on the screen of said display tube a composite picture of the outputs of said scan converters.

2. A multiple scan converter display system according to claim 1 wherein said synchronizing means comprise a timing pulse generator and said synchronizing signals for said scan converters and said display tube are derived from said timing pulse generator.

3. A multiple scan converter system according to claim 2 wherein said means to vary the timing of said synchronizing signals comprises a first delay means coupling the output of said timing pulse generator to said display tube and a second delay means coupling the output of said timing pulse generator to said scan converters.

4. A multiple scan converter system according to claim 3 wherein said first and second delay means are variable and said first delay means is remotely controllable.

5. A multiple scan converter system according to claim 4 wherein said first and second delay means provide horizontal and vertical delay to said display tube.

6. A multiple scan converter display system comprising:
   a plurality of scan converters,
   at least one source of radar-derived video signals,
   means coupling discrete portions of the output of said source to said scan converters,
   a cathode ray display tube,
   a source of synchronizing signals for said scan converters and said cathode ray display tube,
   means coupling the outputs of said scan converters to said display tube,
   means synchronizing the synchronizing signals of said scan converters to the synchronizing signals of said display tube,
   means to vary the timing of said synchronizing signals of said scan converters and said display tube whereby there is produced on the screen of said display tube a composite picture of the outputs of said scan converters.

7. A multiple scan converter system for presenting a mosaic display of discrete geographical areas comprising:
   a plurality of scan converters,
   at least one source of radar-derived video signals,
   means coupling discrete portions of the output of said source to said scan converters, each said discrete portion representing a geographical sector of the total area covered by said source,
   means to limit the video output of each said scan converter within the geographical sector output of each said scan converter,
   a cathode ray display tube, a source of synchronizing signals for said scan converters and said cathode ray display tube, means coupling the outputs of said scan converters to said display tube, means synchronizing the synchronizing signals of said scan converters to the synchronizing signals of said display tube, means to vary the timing of said synchronizing signals of said scan converters and said display tube whereby there is produced on the screen of said display tube a mosaic display of the outputs of said scan converters.

References Cited by the Examiner

UNITED STATES PATENTS

| 2,822,536 | 2/58 | Sandretto | 343—5 |
| 2,858,531 | 10/58 | Stocker | 343—5 |
| 2,972,141 | 2/61 | Barlow et al. | |

FOREIGN PATENTS

| 1,220,305 | 5/60 | France. |
| 822,905 | 11/61 | Great Britain. |

CHESTER L. JUSTUS, *Primary Examiner.*